No. 761,529. Patented May 31, 1904.

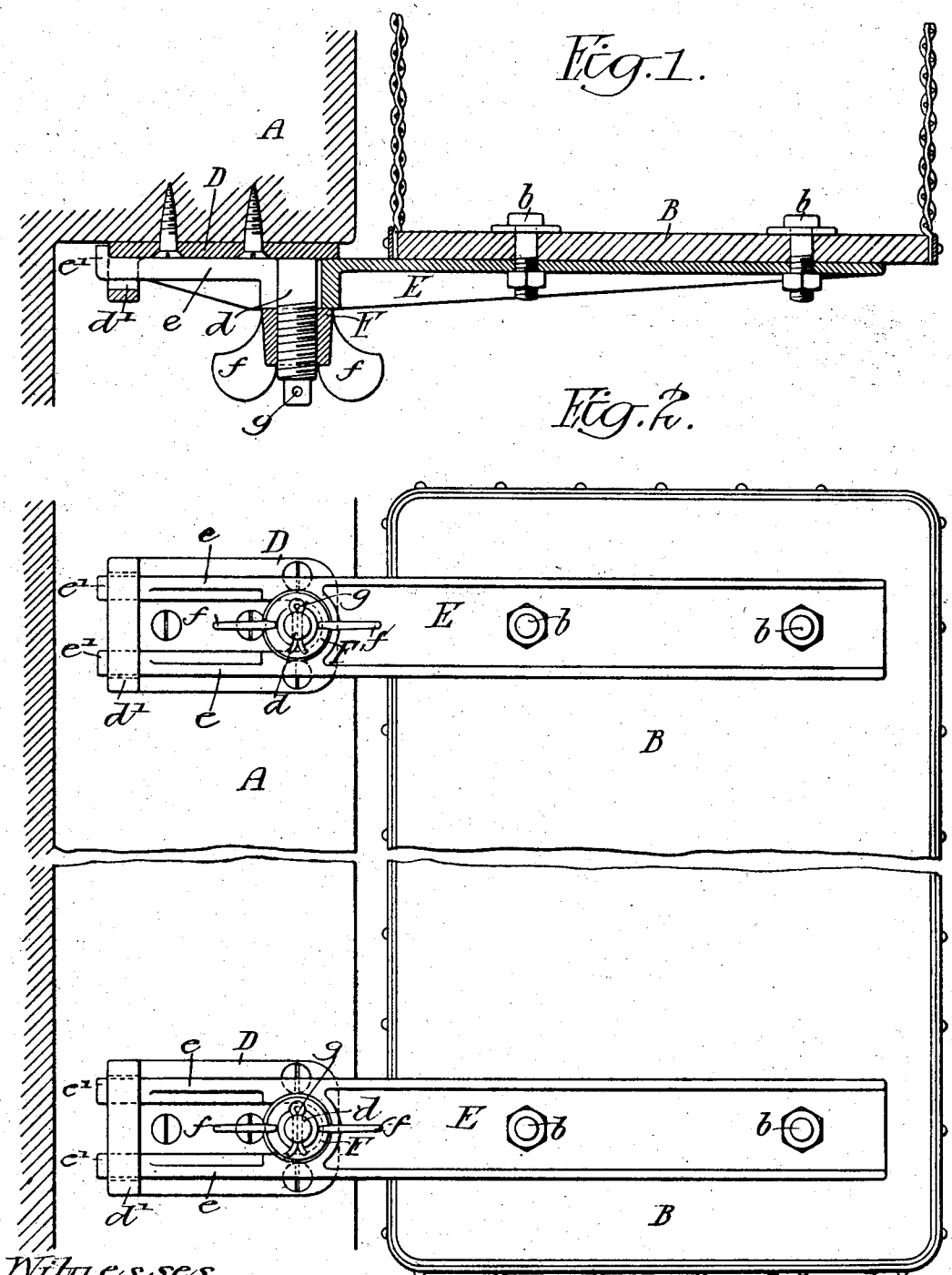

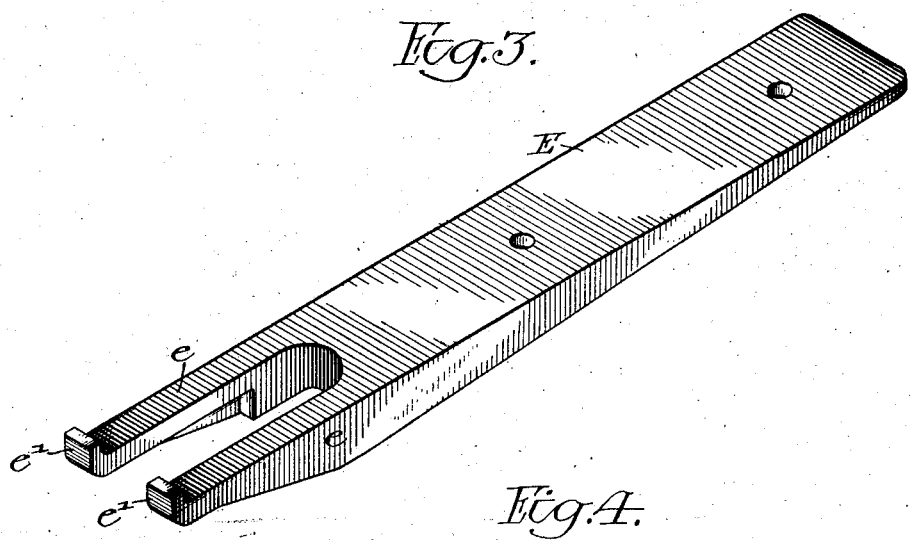
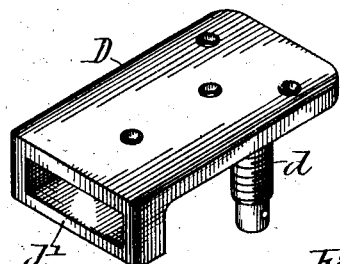
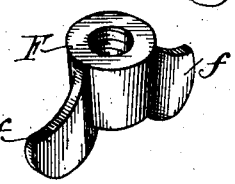
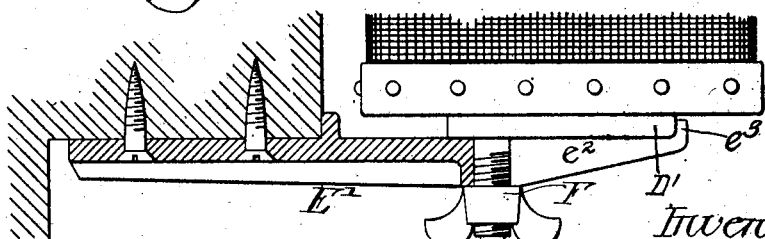

UNITED STATES PATENT OFFICE.

MARK RICHARDS MUCKLÉ, JR., OF PHILADELPHIA, PENNSYLVANIA.

DETACHABLE BRACKET.

SPECIFICATION forming part of Letters Patent No. 761,529, dated May 31, 1904.

Application filed February 1, 1904. Serial No. 191,553. (No model.)

*To all whom it may concern:*

Be it known that I, MARK RICHARDS MUCKLÉ, Jr., a citizen of the United States, residing in Philadelphia, Pennsylvania, have invented certain Improvements in Detachable Brackets, of which the following is a specification.

My invention relates to certain improvements in brackets for supporting the baskets or other receptacles carried by vehicles.

My invention is especially adapted for use in supporting the baskets carried by automobiles; but it will be understood that it can be used to support any object which it is desired to detach from the supporting structure.

The object of my invention is to so construct the bracket that a basket or other suitable receptacle can be readily removed from the automobile or other vehicle when desired, and yet when in place will hold the basket perfectly rigid.

In the accompanying drawings, Figure 1 is a sectional view through sufficient of an automobile-body and a basket to illustrate my invention. Fig. 2 is an inverted plan view. Fig. 3 is a perspective view of the bracket. Fig. 4 is a perspective view of the stud-plate. Fig. 5 is a perspective view of the thumb-nut, and Fig. 6 is a view of a modification.

A is the overhanging body of an automobile. B is a basket of any suitable type, which is usually mounted at the side of the automobile. At the present time the basket is rigidly attached to the automobile by plates; but this is objectionable owing to the fact that the basket is not readily removable. By my invention the basket can be quickly detached from the automobile, and yet when in place will be perfectly secure.

D is a plate from the under side of which projects a screw-stud $d$ and at the back is a band $d'$, forming a socket.

E is the bracket, which is secured to the basket B by bolts $b\ b$. The bracket has two extensions $e\ e$, forming a fork. The extensions $e\ e$ are turned up at the end, forming lips $e'\ e'$, which engage the plate D, as clearly shown in Fig. 1. The band $d'$, however, is a sufficient distance away from the plate to allow for the ready withdrawal of the extensions $e$. The screw-stud $d$ of the plate passes through the forked extension and is provided with a thumb-nut F, having wings $f\ f$. In order to prevent the entire withdrawal of the thumb-nut, a cotter-pin $g$ is passed through a hole in the end of the stud $d$. I usually mount two of the brackets on each basket; but more than two may be used, if desired, according to the size of the basket, or the bracket may be so designed that a single bracket would properly support a basket.

When it is desired to apply the basket to the vehicle, the nut F is turned so as to allow the bracket to freely pass through the space between the band $d'$ and the plate D.

When the bracket is in place, the lips will overlap the edge of the plate. Then by turning the thumb-screw the bracket will be drawn in close contact with the plate and will be firmly held against it.

When two brackets are used and it is desired to detach the basket, all that is necessary is to pass the two arms beneath the basket and simultaneously turn the thumb-nuts F F, so that the brackets will be loose, and then by tilting the basket upward the upturned lips $e'$ of the brackets will be released from the plate D, and the brackets can be readily withdrawn and the basket removed.

In some instances, as shown in Fig. 6, the plate D' can be secured to the basket and the bracket E' secured permanently to the vehicle, the bracket having two extensions $e^2$, forming a slot for the reception of the stud $d^2$, the lips $e^3$ on the extensions engaging the edge of the plate D', as shown.

While my improved detachable bracket is especially applicable to automobiles, it will be understood that it can be used for supporting any article and applied to any object without departing from my invention.

I claim as my invention—

1. The combination of a plate, a stud thereon, a bracket slotted to receive the stud and having a lip engaging the plate, and means on the stud for clamping the bracket to the plate, substantially as described.

2. The combination of a plate, a stud thereon, a bracket slotted to receive the stud and having a lip engaging the plate, the stud fitting against the inner end of the slot and with the lug preventing one part moving on the other, and means on the stud for clamping the bracket to the plate, substantially as described.

3. The combination of a plate having a projecting stud, a bracket having extensions at one end forming a fork, said extensions having lips, one part being held against movement on the other part by the lips and the stud, and means on the stud for clamping the two parts together, substantially as described.

4. The combination of a plate having a screw-stud at one end, a socket at the other end formed by a cross-bar, a bracket having two extensions forming a fork, the stud on the plate passing through the fork, the ends of the extensions being turned up to form lips and extending through the socket and engaging the rear of the plate, with a nut on the stud arranged to secure the bracket to the plate, substantially as described.

In testimony whereof I have signed my name to this specification in the presence of two subscribing witnesses.

MARK RICHARDS MUCKLÉ, Jr.

Witnesses:
WILL. A. BARR,
JOS. H. KLEIN.